United States Patent
Tsai

(10) Patent No.: US 7,112,082 B2
(45) Date of Patent: Sep. 26, 2006

(54) MINIATURE MEMORY CARD/SIM CARD DUAL-FUNCTION CONNECTOR

(75) Inventor: Chun-Jung Tsai, Taipei (TW)

(73) Assignee: Wieson Technologies Co., Ltd., Taipei Hsien (TW)

( * ) Notice: Subject to any disclaimer, the term of this patent is extended or adjusted under 35 U.S.C. 154(b) by 0 days.

(21) Appl. No.: 10/905,638

(22) Filed: Jan. 13, 2005

(65) Prior Publication Data

US 2005/0208815 A1   Sep. 22, 2005

Related U.S. Application Data

(63) Continuation-in-part of application No. 10/708,673, filed on Mar. 17, 2004, now abandoned.

(51) Int. Cl.
*H01R 13/62* (2006.01)

(52) U.S. Cl. ..................................... 439/329

(58) Field of Classification Search ................ 439/329, 439/326, 940, 331, 59–60, 630, 924.1; 361/737, 361/783

See application file for complete search history.

(56) References Cited

U.S. PATENT DOCUMENTS

| | | | |
|---|---|---|---|
| 6,220,882 B1* | 4/2001 | Simmel et al. | 439/326 |
| 6,231,365 B1* | 5/2001 | Konno et al. | 439/331 |
| 6,370,362 B1* | 4/2002 | Hansen et al. | 455/90.1 |
| 6,669,487 B1* | 12/2003 | Nishizawa et al. | 439/60 |
| 2001/0021657 A1* | 9/2001 | Morita | 455/550 |
| 2004/0180692 A1* | 9/2004 | Yang et al. | 455/557 |

* cited by examiner

*Primary Examiner*—J. F. Duverne

(57) ABSTRACT

A miniature memory card/SIM card dual-function connector for installation in a circuit board for computer/cellular phone is disclosed to include a connector body, a memory card module and a SIM (Subscriber Identity Module) mounted in the connector body for receiving a memory card and a SIM card respectively, two sets of terminals respectively electrically connected to the memory card module and the SIM and respectively extending to the rear side and bottom side of the connector body for connection to the circuit board, and a shielding cover covering the top of the connector body.

6 Claims, 5 Drawing Sheets

US 7,112,082 B2

MINIATURE MEMORY CARD/SIM CARD DUAL-FUNCTION CONNECTOR

This application is a Continuation-In-Part of my patent application, Ser. No. 10/708,673, filed on Mar. 17, 2004 now abandoned.

BACKGROUND OF THE INVENTION

1. Field of the Invention

The present invention relates to an electric connector and more specifically, to a miniature memory card/SIM card dual-function connector, which is practical for use in a computer or cellular phone to receive a memory card and a SIM card, thereby providing memory and user identity identification functions.

2. Description of the Related Art

In the modern cyber era, cellular phone has become the requisite personal communication apparatus to most people. From early "black KingKon (blank giant)" to the modern miniature models, a variety of cellular phones have been developed. In addition to the function of communication, a modern cellular provides added functions, such as cam camera, e-mail, music/picture download, and etc. For storing more data, much memory space is required. However, a cellular phone has a limited memory space. Further, a computer has a big memory space, however it does not provide a subscriber identity identification function to protect the security of storage data. Without the function of subscriber identity identification, other people can easily access to the computer of a company to steal the customer file, business data, and other secret information of the company.

Regular card connectors include single card connectors and multi-card connectors. A single card connector is specifically designed to fit one particular model of memory card. A multi-card connector has multiple insertion slots for receiving different memory cards. However, conventional multi-card connectors are simply designed to receive different memory cards. They do not provide any added functions (for example, subscriber identity identification function).

Therefore, it is desirable to provide a connector that eliminates the aforesaid drawbacks.

SUMMARY OF THE INVENTION

The present invention has been accomplished under the circumstances in view. According to one aspect of the present invention, the miniature memory card/SIM card connector comprises a memory card module and a SIM (Subscriber Identity Module) for receiving a memory card and a SIM card respectively to provide a memory function and a subscriber identity identification function. According to another aspect of the present invention, the terminals of the memory card module and the terminals of the SIM are arranged at different sides to prevent short circuit, and the memory card module is set perpendicular to the SIM, so that the user can conveniently accurately insert the memory card and the SIM card into the memory card module and the SIM without interference.

DETAILED DESCRIPTION OF THE EMBODIMENT

Figure 1:
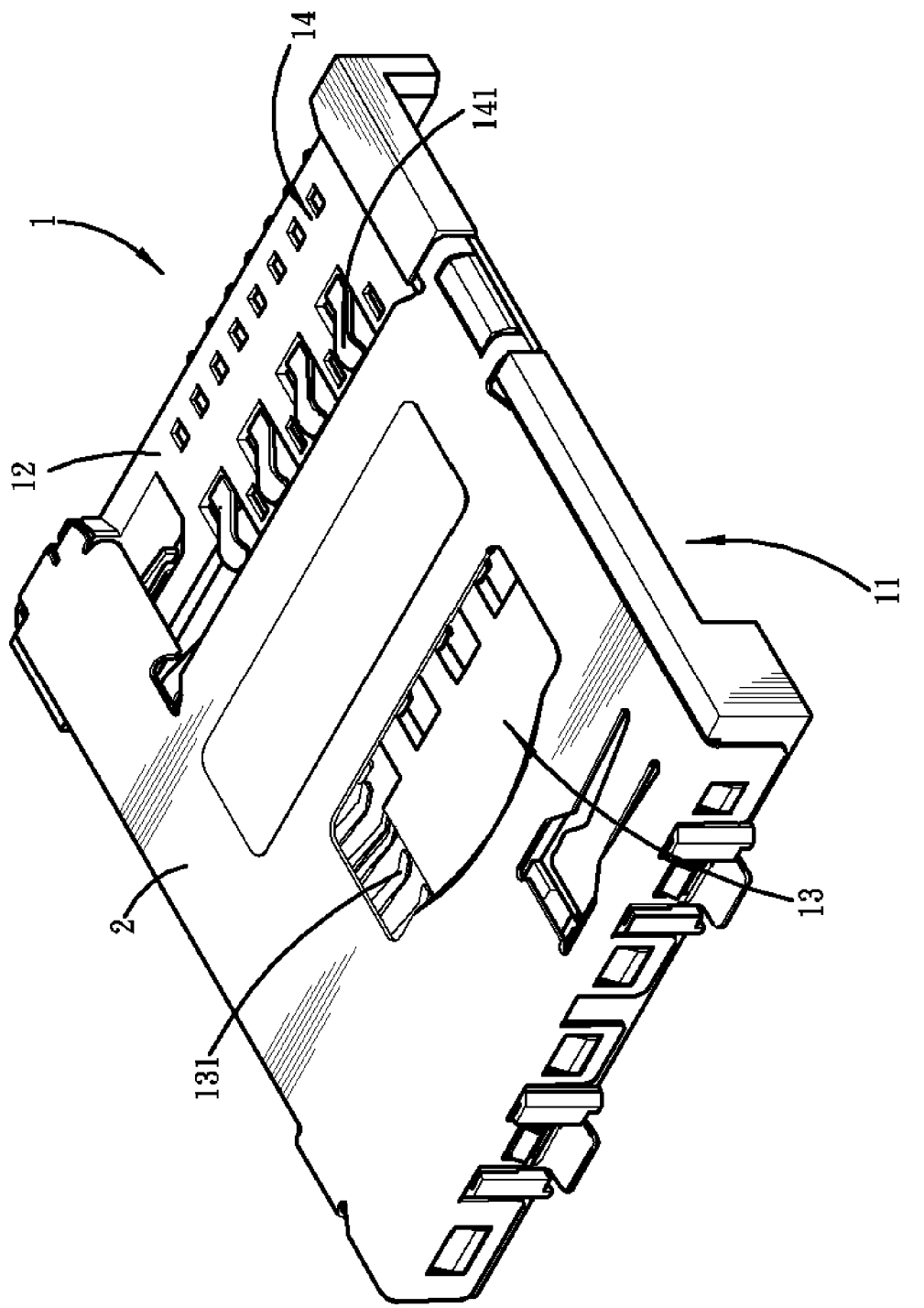
FIG. 1 is an exploded view of a miniature memory card/SIM card dual-function connector according to the present invention.
Figure 2:
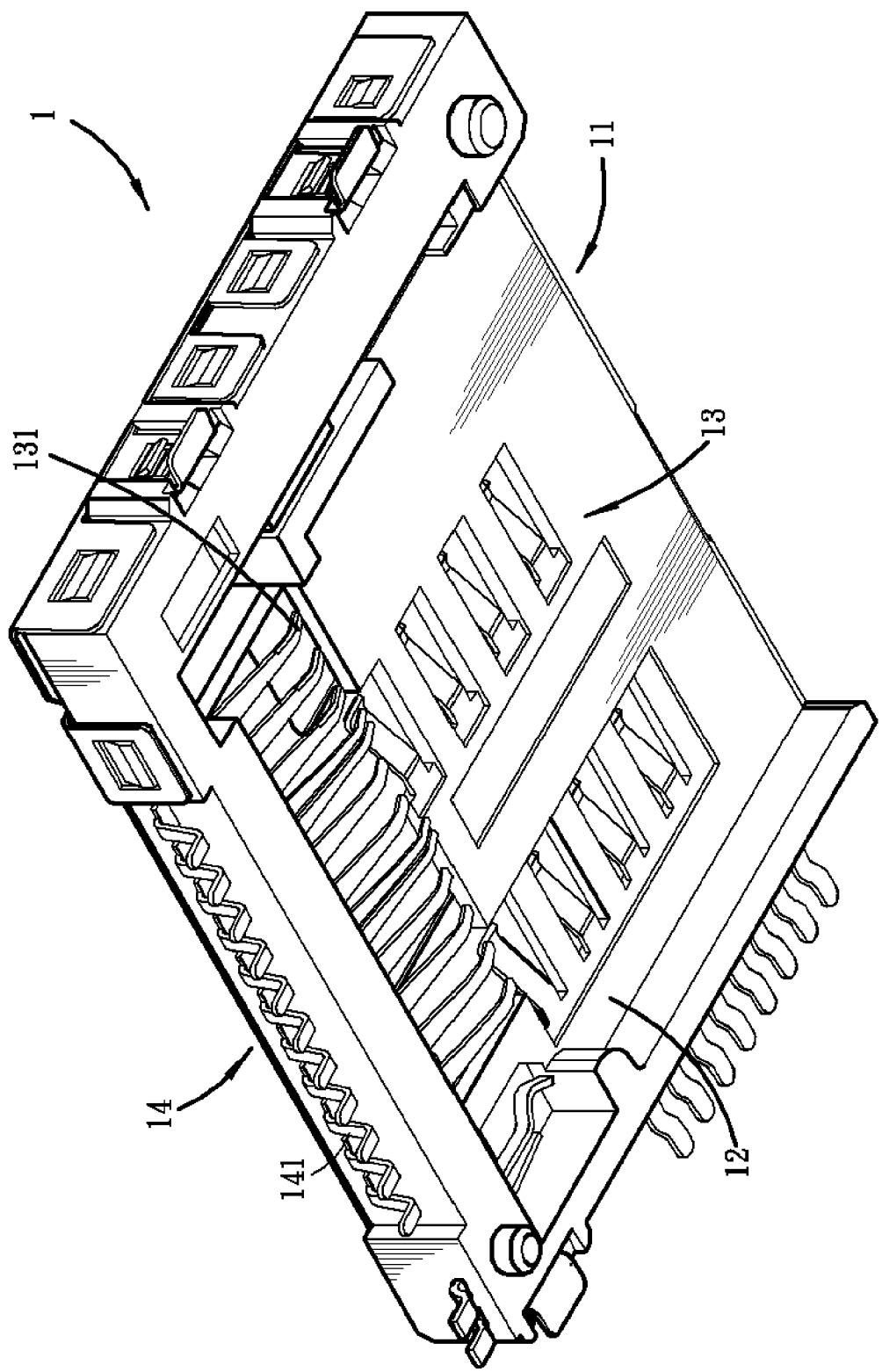
FIG. 2 is an oblique bottom elevation of the miniature memory card/SIM card dual-function connector according to the present invention.

Referring to FIGS. 1 and 2, a miniature memory card/SIM card dual-function connector in accordance with the present invention is shown comprised of a connector body 1 and a shielding cover 2.

The connector body 1 comprises a receiving chamber 11 having a bottom plate 111, a partition board 12 arranged inside the receiving chamber 11 above the bottom plate 111 to separate the receiving chamber 11 into two separated spaces that accommodates a memory card module 13 and a SIM (Subscriber Identity Module) 14 respectively, a set of first terminals 131 respectively electrically extending from one end of the memory card module 13 to the outside of the connector body 1, and a set of second terminals 141 respectively electrically connected to the SIM 14 and arranged at the bottom side of the SIM 14. The memory card module 13 comprises a sliding lock 132 disposed at one side, a detection terminal 133 disposed adjacent to the sliding lock 132, and a grounding plate 134 disposed at the opposite side. The shielding cover 2 covers the top side of the connector body 1.

Figure 3:
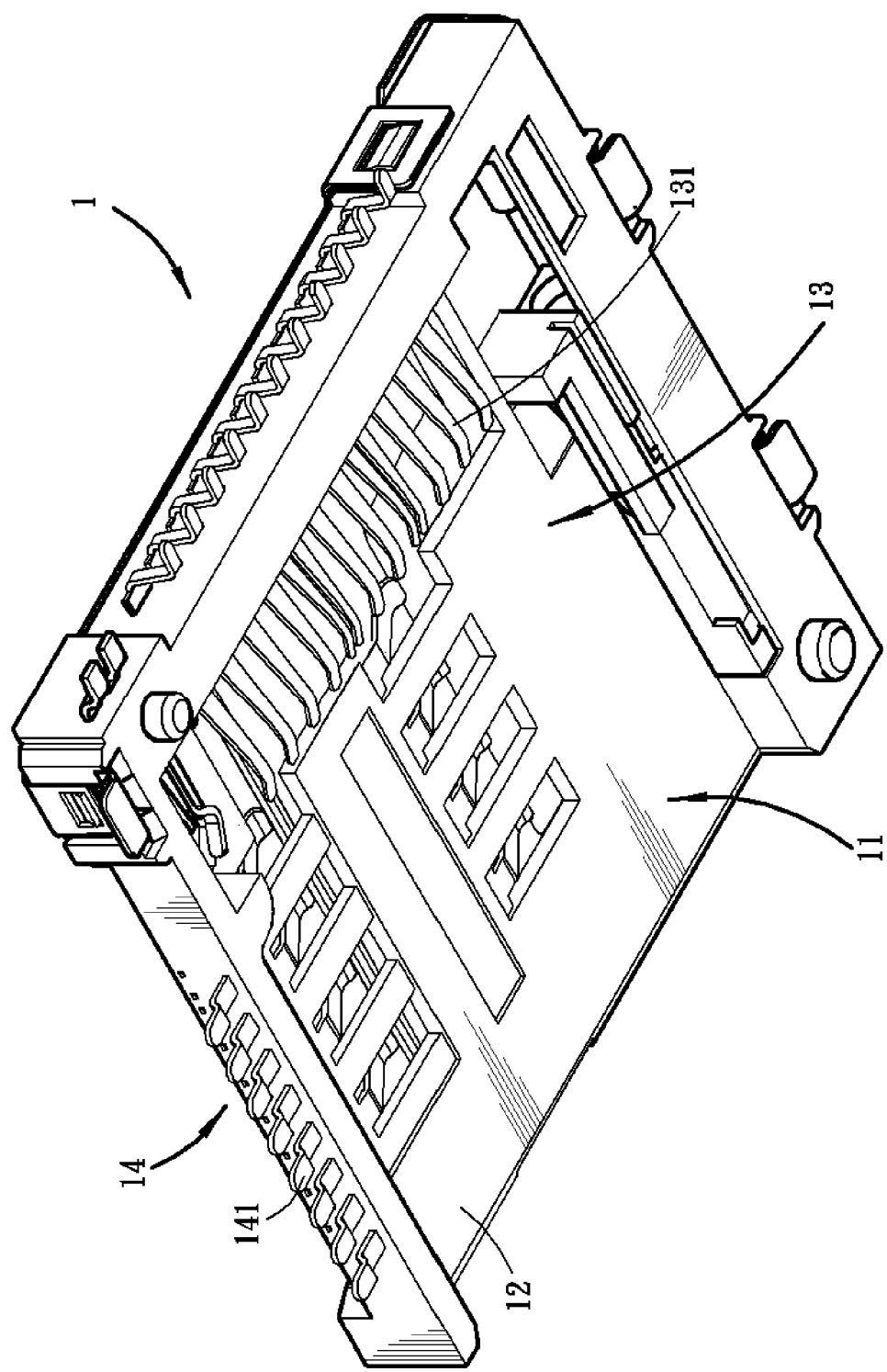
FIG. 3 is a schematic drawing of the present invention before insertion of the memory card and the SIM card according to the present invention.
Figure 4:
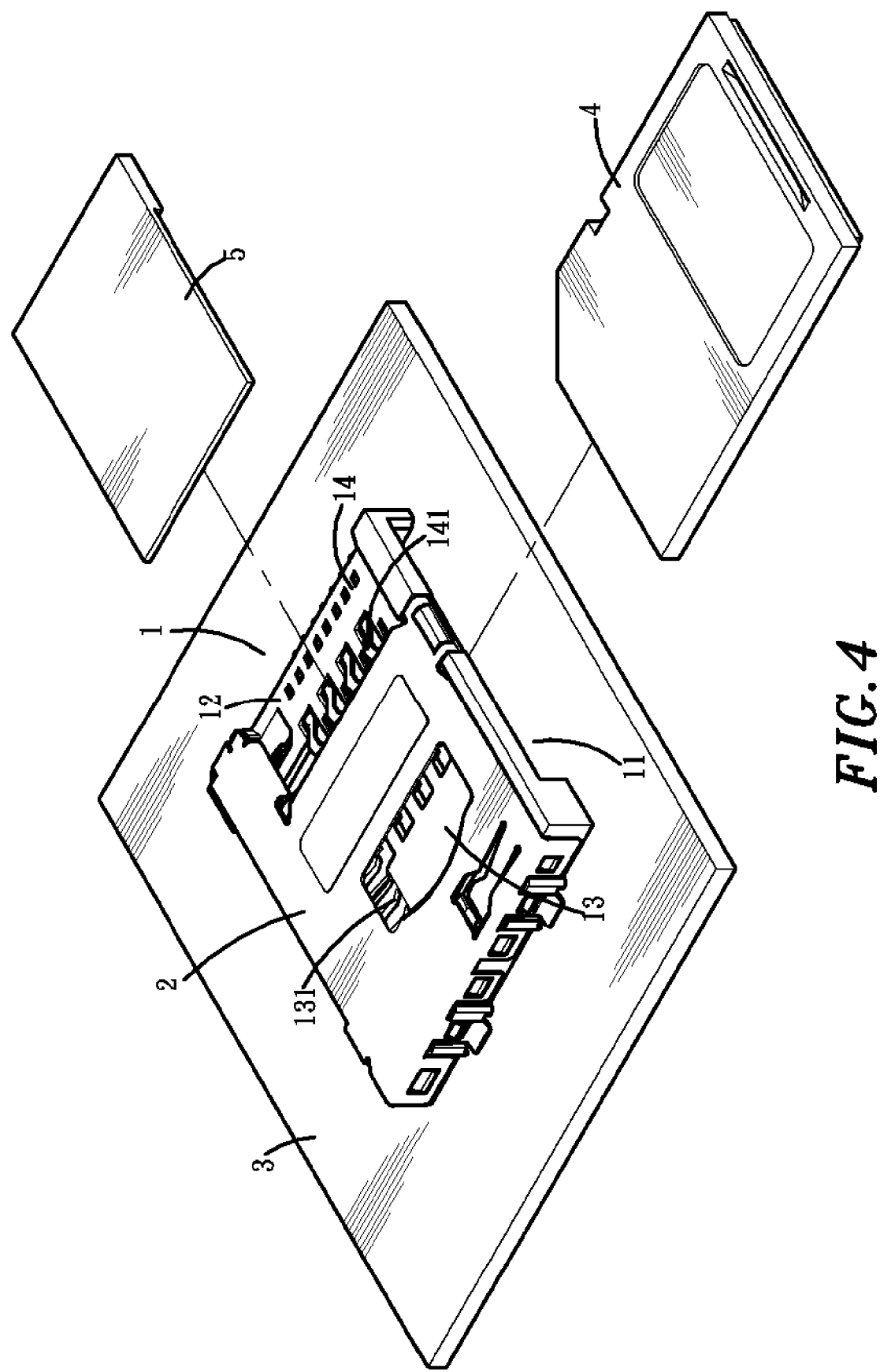
FIG. 4 illustrates the memory card and the SIM card respectively inserted into the memory card module and the SIM according to the present invention.

Referring to FIGS. 3 and 4, the miniature memory card/SIM card dual-function connector is mounted in the top side of a circuit board 3. The memory card, referenced by 4, is inserted into the insertion side of the memory card module 13 and locked by the sliding lock 132, and then the SIM card, referenced by 5, is inserted into the insertion side of the SIM 14. After installation, the memory card 4 and the SIM card 5 respectively partially extend out of the memory card module 13 and the SIM 14 so that the user can conveniently pull the memory card 4 and the SIM card 5 out of the memory card module 13 and the SIM 14 for a replacement. The detection terminal 133 is provided to detect accurate positioning of the memory card 4 in the memory card module 13. The grounding plate 134 is provided to prevent interference of noises.

Figure 5:
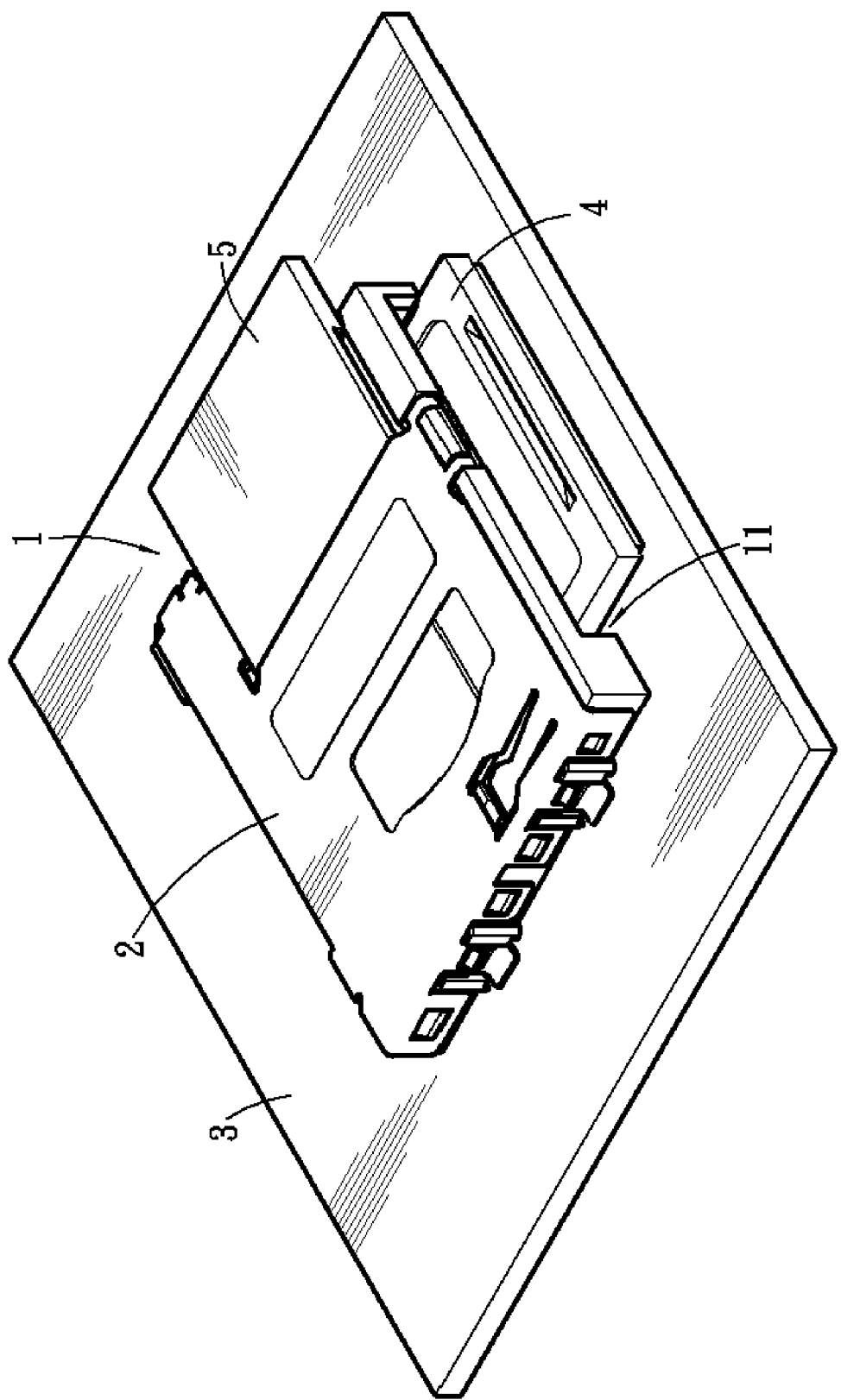
FIG. 5 shows an alternate form of the present invention.

FIG. 5 shows an alternate form of the present invention. The miniature memory card/SIM card dual-function connector according to this embodiment comprises a connector body 1 and a shielding cover 2 covering the connector body 1. The connector body 1 comprises a receiving chamber 11, which accommodates a memory card module 13 and a SIM 14, first terminals 131 respectively electrically connected to the memory card module 13, second terminals 141 respectively electrically connected to the SIM 14, and a partition board 12 mounted inside the receiving chamber 11 to separate the memory card module 13 and the SIM 14. Further, the bottom side of the connector body 1 is a bottom opening in a bottom side in communication with the receiving chamber 11. The memory card 4 is inserted from a first side of the connector body 1 into the memory card module 13 and maintained in close contact with the first terminals 131. The SIM card 5 is inserted from a second side of the connector body 1 into the SIM 14 and maintained in close contact with the second terminals 141. Therefore, the connector provides memory and user identity identification functions. As indicated, the first terminals 131 and the second terminals 141 are arranged in different directions for easy installation. Further, because the insertion side of the memory card module 13 and the insertion side of the SIM 14 are arranged in different directions, the user can conveniently accurately insert the memory card 4 and the SIM card 5 into the memory card module 13 and the SIM 14 without interference. According to the present invention, the SIM 14 is set perpendicular to the memory card module 13. Further, the bottom side of the receiving chamber 11 of the connector body 1 can be a bottom opening (the aforesaid bottom plate 111 eliminated) for direct connection to the circuit board 3 to reduce the installation height and to minimize space occupation. Therefore, the miniature memory card/SIM card dual-function connector meets the requirements of modern electronic's features such as light, thin, short, small and high precision.

The miniature memory card/SIM card dual-function connector of the present invention is suitable for use in computer and cellular phone. When used in a computer, the connector adds a subscriber identity identification function to the computer to protect security of storage data. When used in a cellular phone, the connector extends the capacity of the memory of the cellular phone while keeping the subscriber identity identification function in functioning. Further, the aforesaid bottom plate 111 may be eliminated, or a circuit board 3 may be used to substitute for the bottom plate 111.

A prototype of miniature memory card/SIM card dual-function connector has been constructed with the features of FIGS. 1~5. The miniature memory card/SIM card dual-function connector functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A miniature memory card/SIM card dual-function connector suitable for a circuit board of a computer/cellular phone, comprising a connector body, said connector body comprising a receiving chamber, a partition board separating said receiving chamber into a first space and a second space, a memory card module mounted in said first space and adapted to receive a memory card, and a SIM (Subscriber Identity Module) mounted in said second space and adapted to receive a SIM card, a set of first terminals respectively electrically connected to said memory card module, and a set of second terminals respectively electrically connected to said SIM, and a shielding cover covering a top side of said connector body, wherein said memory card module comprises a detection terminal disposed at one side and adapted to detect positioning of the inserted memory card, and a grounding plate disposed at an opposite side.

2. The miniature memory card/SIM card dual-function connector as claimed in claim 1, wherein said memory card module comprises a sliding lock disposed at one side and adapted to lock the inserted memory card.

3. The miniature memory card/SIM card dual-function connector as claimed in claim 1, wherein said connector body comprises a bottom plate at a bottom side of said receiving chamber.

4. A miniature memory card/SIM card dual-function connector suitable for a circuit board of a computer/cellular phone, comprising a connector body, said connector body comprising a receiving chamber, a partition board separating said receiving chamber into a first space and a second space, a bottom opening in a bottom side thereof in communication with said receiving chamber, a memory card module mounted in said first space and adapted to receive a memory card, and a SIM (Subscriber Identity Module) mounted in said second space and adapted to receive a SIM card, and a shielding cover covering a top side of said connector body, wherein said memory card module comprises a detection terminal disposed at one side and adapted to detect positioning of the inserted memory card, and a grounding plate disposed at an opposite side.

5. The miniature memory card/SIM card dual-function connector as claimed in claim 4, wherein said connector body further comprises a plurality of terminals respectively electrically connected to said memory card module.

6. The miniature memory card/SIM card dual-function connector as claimed in claim 4, wherein said connector body further comprises a plurality of terminals respectively electrically connected to said SIM.

* * * * *